United States Patent
Omoragbon et al.

(10) Patent No.: US 12,246,839 B2
(45) Date of Patent: Mar. 11, 2025

(54) OFFSET LEG ASSEMBLY FOR AIRCRAFT PASSENGER SEATS

(71) Applicant: SAFRAN SEATS USA LLC, Gainesville, TX (US)

(72) Inventors: Amen Omoragbon, Gainesville, TX (US); Nahum Madrid, Gainesville, TX (US); Reza Mansouri, Gainesville, TX (US)

(73) Assignee: SAFRAN SEATS USA LLC, Gainesville, TX (US)

( * ) Notice: Subject to any disclaimer, the term of this patent is extended or adjusted under 35 U.S.C. 154(b) by 67 days.

(21) Appl. No.: 18/062,177

(22) Filed: Dec. 6, 2022

(65) Prior Publication Data

US 2024/0182172 A1 Jun. 6, 2024

(51) Int. Cl.
  *B64D 11/06* (2006.01)

(52) U.S. Cl.
  CPC ...... *B64D 11/0646* (2014.12); *B64D 11/0648* (2014.12); *B64D 11/0696* (2013.01)

(58) Field of Classification Search
  CPC .......... B64D 11/0696; B64D 11/0648
  See application file for complete search history.

(56) References Cited

U.S. PATENT DOCUMENTS

| | | | |
|---|---|---|---|
| 6,672,661 B2 | 1/2004 | Williamson | |
| 2003/0094542 A1* | 5/2003 | Williamson | B60N 2/062 244/122 R |
| 2003/0094838 A1 | 5/2003 | Williamson | |
| 2017/0233079 A1 | 8/2017 | Kovago | |
| 2019/0092476 A1* | 3/2019 | Gross | B64D 11/0696 |
| 2020/0086995 A1* | 3/2020 | Cheung | B64D 11/064 |
| 2021/0387732 A1 | 12/2021 | Salzer | |
| 2023/0278710 A1* | 9/2023 | Ramarathnam | B60N 2/90 297/452.18 |

FOREIGN PATENT DOCUMENTS

| | | |
|---|---|---|
| DE | 1900079 A1 | 8/1970 |
| GB | 2582654 A | 9/2020 |
| WO | 2014058401 A2 | 4/2014 |

OTHER PUBLICATIONS

Extended European Search Report, in corresponding European Application No. 23213983.2, filed Dec. 4, 2023, 10 pages.

* cited by examiner

*Primary Examiner* — Joshua J Michener
*Assistant Examiner* — Arfan Y. Sinaki
(74) *Attorney, Agent, or Firm* — Christensen O'Connor Johnson Kindness PLLC (57) ABSTRACT

An offset leg assembly for a passenger seat for a vehicle such as an aircraft is provided. The leg assembly can include a base leg portion having a lower end configured to operably couple to a seat track coupling assembly and an upper end opposite the lower end, and an upper leg portion coupled to a lateral side of the upper end of the base leg portion, the upper leg portion having an aperture configured to receive a base frame tube of the passenger seat. The upper leg portion can be positioned laterally offset from the seat track coupling assembly along the base frame such that the upper mounting location on the base frame tubes is not vertically aligned with the lower mounting location to the aircraft fuselage attachment points.

16 Claims, 7 Drawing Sheets

OFFSET LEG ASSEMBLY FOR AIRCRAFT PASSENGER SEATS

FIELD OF DISCLOSURE

The present disclosure relates to seat leg assemblies. More particularly, the present disclosure relates to leg assemblies associated with aircraft passenger seats and having laterally offset upper and lower mounting portions.

BACKGROUND

Passenger vehicles, such as aircraft, buses, trains, ships, and automobiles, often include one or more passenger seats in which passengers are seated during travel. A passenger seat can include structural leg components that connect the passenger seat to a base of the passenger vehicle, such as a floor, bracket, track, etc. For example, a structural leg component for an aircraft passenger seat can be mounted by the lower mounting portion to a seat track on the floor of an aircraft. Traditionally, such leg components would have an upper mounting portion that is laterally aligned with the lower mounting portion.

The upper mounting portion of the leg component is often operably coupled to a seat base frame tube extending laterally across a seat row assembly and configured to additionally couple other seat components (e.g., armrests, folding tray tables, seat base brackets, seat back brackets, etc.) to the seat row assembly. In configurations where the lateral seat layout is such that another seat component is laterally aligned with the seat track position on the floor, the upper mounting portion of the leg component can interfere with coupling the other component along the base frame tube.

SUMMARY

The present disclosure provides examples of a leg assembly for an aircraft passenger seat that can have laterally offset forward and aft portions to operably couple a seat row assembly to aircraft fuselage attachment points (e.g., seat tracks) on an aircraft floor. As will be described in more detail below, the offset portions of the leg assembly can be arranged such that the upper mounting location on the base frame tubes is not vertically aligned with the lower mounting location to the aircraft fuselage attachment points.

In accordance with an aspect of the present disclosure, a leg assembly for an aircraft passenger seat is provided. In an embodiment, the leg assembly includes a base leg portion having a lower end configured to operably couple to a seat track coupling assembly and an upper end opposite the lower end; and an upper leg portion coupled to a lateral side of the upper end of the base leg portion, the upper leg portion having an aperture configured to receive a base frame tube of the passenger seat. The upper leg portion can be positioned laterally offset from the seat track coupling assembly along the base frame tube.

In accordance with another aspect of the present disclosure, a leg assembly for an aircraft passenger seat is provided. In an embodiment, the leg assembly includes a forward leg assembly having a forward base leg portion having a lower end configured to operably couple to a forward seat track coupling assembly, and a forward upper leg portion coupled to a lateral side of an upper end of the forward base leg portion opposite the lower end. The forward upper leg portion can have a forward aperture configured to receive a forward base frame tube of the aircraft passenger seat. The leg assembly further includes an aft leg assembly laterally aligned with and positioned apart from the forward leg assembly, the aft leg assembly having an aft base leg portion having a lower end configured to operably couple to an aft seat track coupling assembly, and an aft upper leg portion coupled to a lateral side of an upper end of the aft base leg portion opposite the lower end. The aft upper leg portion can have an aft aperture configured to receive an aft base frame tube of the passenger seat, and the forward and aft upper leg portions can be respectively positioned laterally offset from the forward and aft seat track coupling assemblies along the forward and aft base frame tubes.

In accordance with another aspect of the present disclosure, a passenger seat is provided. In an embodiment, the passenger seat includes a seat back; a seat base frame assembly operably coupled between a seat track of an aircraft fuselage and the seat back. The seat base frame assembly includes a forward base frame tube; an aft base frame tube spaced apart from the forward base frame tube; a forward leg assembly including a forward base leg portion and a forward upper leg portion coupled to a lateral side of an upper end of the forward base leg portion. The forward upper leg portion can have a forward aperture for receiving the forward base frame tube. The seat base frame assembly further includes an aft leg assembly laterally aligned with and positioned apart from the forward leg assembly, the aft leg assembly including an aft base leg portion and an aft upper leg portion coupled to a lateral side of an upper end of the aft base leg portion. The aft upper leg portion can have an aft aperture for receiving the aft base frame tube, and the forward and aft upper leg portions can be positioned laterally offset from the seat track along the forward and aft base frame tubes.

In any of the embodiments of the present disclosure, the base leg portion can be a forward base leg portion, the seat track coupling assembly is a forward seat track coupling assembly, the upper leg portion is a forward upper leg portion, the aperture is a forward aperture, and the base frame tube is a forward base frame tube. The leg assembly can further include an aft base leg portion laterally aligned with and positioned apart from the forward base leg portion, the aft base leg portion having a lower end configured to operably couple to an aft seat track coupling assembly and an upper end opposite the lower end; and an aft upper leg portion coupled to a lateral side of the upper end of the aft base leg portion, the aft upper leg portion having an aft aperture configured to receive an aft base frame tube of the passenger seat. The aft upper leg portion can be positioned laterally offset from the aft seat track coupling assembly along the aft base frame tube.

In any of the embodiments of the present disclosure, the forward upper leg portion can be laterally offset along the forward base frame tube in the same direction as the lateral offset of the aft upper leg portion along the aft base frame tube.

In any of the embodiments of the present disclosure, the lower end of the forward base leg portion can be positioned forward of the upper end of the forward base leg portion, and wherein the lower end and the upper end of the aft base leg portion are vertically aligned.

In any of the embodiments of the present disclosure, the forward base leg portion can be non-linear.

In any of the embodiments of the present disclosure, the aft base leg portion can be linear.

In any of the embodiments of the present disclosure, the upper end of the forward base leg portion can include a forward coupling pocket having an aperture configured to receive a fastener therethrough to operably couple the forward upper leg portion to the forward base leg portion, and the upper end of the aft base leg portion can include an aft coupling pocket having an aperture configured to receive a fastener therethrough to operably couple the aft upper leg portion to the aft base leg portion.

In any of the embodiments of the present disclosure, the leg assembly further includes a forward spacer configured to be received within the forward coupling pocket, the forward spacer extending from the forward coupling pocket to the forward upper leg portion; and an aft spacer configured to be received within the aft coupling pocket, the aft spacer extending from the aft coupling pocket to the aft upper leg portion.

In any of the embodiments of the present disclosure, a spreader can be operably coupled the lower end of the forward base leg portion and the lower end of the aft base leg portion.

In any of the embodiments of the present disclosure, the aft base leg portion can include an aperture configured to receive a luggage bar.

In any of the embodiments of the present disclosure, the forward upper leg portion can be laterally offset along the forward base frame tube in the same direction as the lateral offset of the aft upper leg portion along the aft base frame tube.

In any of the embodiments of the present disclosure, a secondary forward leg can be operably coupled to the forward base frame tube at a position vertically aligned with the seat track and spaced laterally apart from the forward leg assembly; and a secondary aft leg can be operably coupled to the aft base frame tube at a position vertically aligned with the seat track and laterally aligned with the secondary forward leg.

In any of the embodiments of the present disclosure, a spreader can be operably coupled to the aft base frame tube in a position vertically aligned with the seat track.

In any of the embodiments of the present disclosure, the forward and aft leg assemblies can be positioned closer to an aisle of the aircraft fuselage than the secondary forward and aft legs.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

As will be described in more detail below, the present disclosure provides examples of laterally offset forward and aft passenger seat leg assemblies to operably couple a seat row assembly to aircraft fuselage attachment points (e.g., seat tracks) on an aircraft floor. The leg assemblies have laterally offset components such that the upper mounting location on the base frame tubes is not vertically aligned with the lower mounting location to the aircraft fuselage attachment points. In this regard, in configurations of the passenger seat assembly where another seat component (e.g., an armrest, a tray bracket, a seat bracket, etc.) is generally positioned in vertical alignment with the aircraft fuselage attachment points, the leg assemblies can be arranged to mount to the aircraft fuselage attachment point while laterally offsetting the position of the upper leg portion of the leg assembly along the base frame tubes. This configuration permits mounting the vertically aligned component (e.g., the armrest, the tray bracket, the seat bracket, etc.) on the base frame tubes vertically above the aircraft fuselage attachment point without interfering with the upper leg portion of the leg assembly. Using embodiments of the present disclosure, seating configurations with different passenger area widths (e.g., business class, premium class, standard class, etc.) can mount to the same seat track positions without needing different configurations for other seat components (e.g., spreaders carrying armrests).

Although embodiments of the present disclosure may be described with reference to an aircraft passenger seat, one skilled in the relevant art will appreciate that the disclosed embodiments are illustrative in nature and therefore should not be construed as limited to such an application. It should therefore be apparent that the disclosed technologies and methodologies have wide application, and therefore may be suitable for use with many types of seat mounting arrangements, including seats of any type, such as passenger seats employed in buses, trains, ships, and the like. Accordingly, the following descriptions and illustrations herein should not limit the scope of the claimed subject matter.

For example, U.S. patent application Ser. No. 17/686,610, which is presently assigned to Safran Seats USA LLC, and which is incorporated by reference herein in its entirety, discloses structural seat leg components having a forward leg and an aft leg, each with laterally aligned upper and lower mounting portions. When another seat component is positioned on the seat row assembly laterally aligned with the seat track, and likewise to the lower mounting portion of the forward or aft leg, the upper mounting portion of the leg can interfere with coupling the other component to the base frame tube, requiring the other seat component to operably couple to the base frame tube in either direction laterally away from the upper mounting portion of the forward or aft leg.

Figure 1:
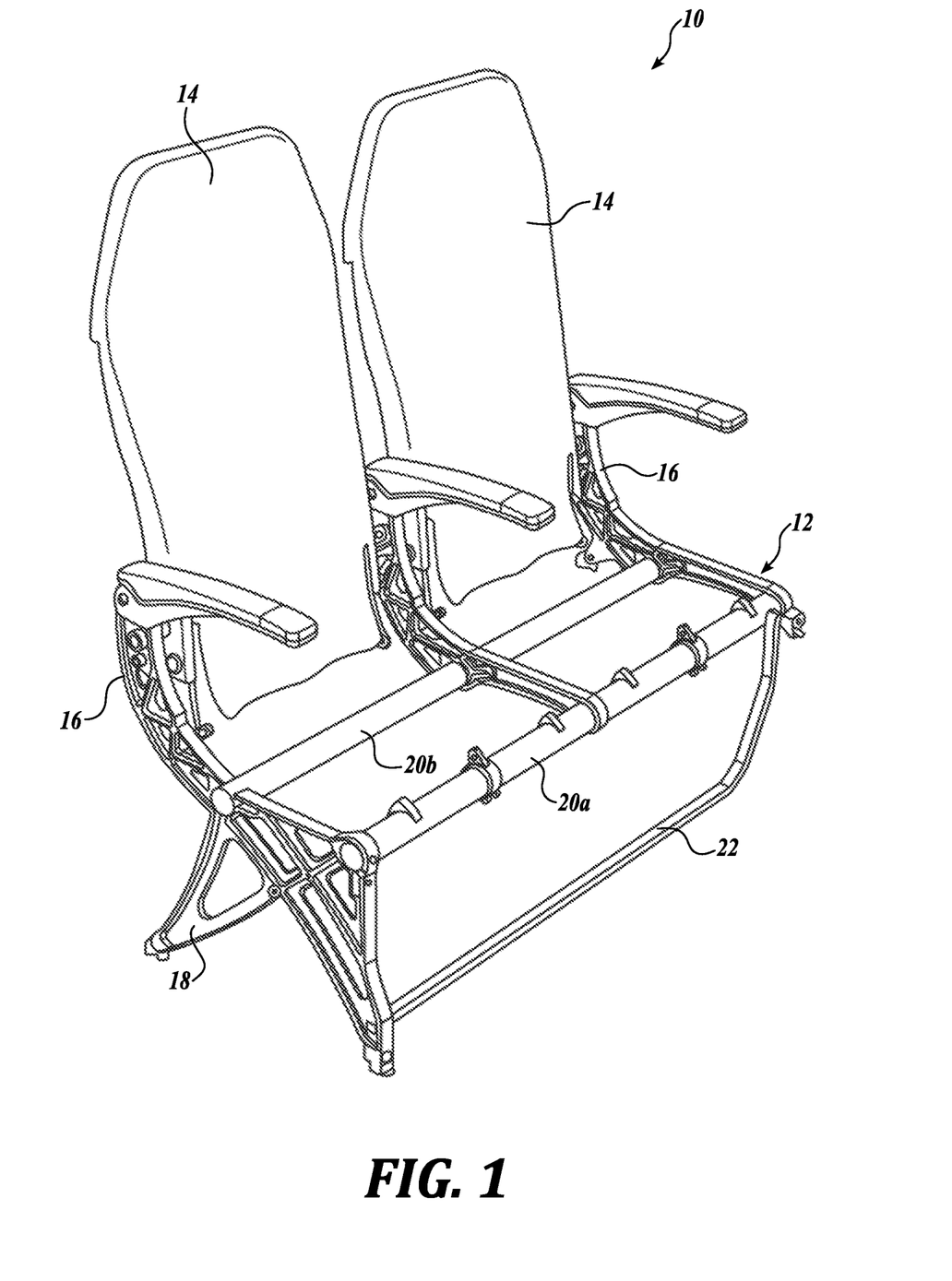
FIG. 1 depicts one example of a generalized environment, such as a passenger seat assembly shown in perspective view, in which technologies and/or methodologies of the present disclosure may be employed.

FIG. 1 depicts one example of a generalized environment, such as a passenger seat assembly 10 shown in perspective view, in which technologies and/or methodologies of the present disclosure may be employed. The passenger seat assembly 10 can include a seat base frame assembly 12 and one or more seat backs 14 operably coupled to the seat base frame assembly 12. Although the passenger seat assembly 10 is shown in a configuration for carrying two passengers and accordingly includes two seat backs 14, the passenger seat assembly 10 suitable for use with embodiments of the present disclosure can be configured to carry any quantity of passengers with corresponding quantity of seat backs 14. The seat back 14 can be pivotable relative to the seat base frame assembly 12 such that the seat back 14 can be rotated to various positions such as an upright taxi-takeoff-landing (TTL) position, a reclined position, etc.

The seat base frame assembly 12 of the passenger seat assembly 10 can include one or more leg assemblies 18 that couple the seat base frame assembly 12 to the aircraft fuselage attachment points (e.g., seat tracks) and at least one base frame tube 20 configured to provide structure and carry components of the passenger seat assembly 10. In the illustrated embodiment, the seat base frame assembly 12 includes first and second base frame tubes 20a and 20b, respectively. The seat base frame assembly 12 can also include one or more additional components, including spreaders 16, a luggage bar 22, and other general components such as seat pans, spreaders, and mounting brackets. The passenger seat assembly 10 is provided as one example of a generalized environment (e.g., an aircraft passenger compartment passenger seat assembly) in which technologies of the present disclosure may be employed, and as such, FIG. 1 may omit various well-known components for purposes of clarity.

Figure 2A:
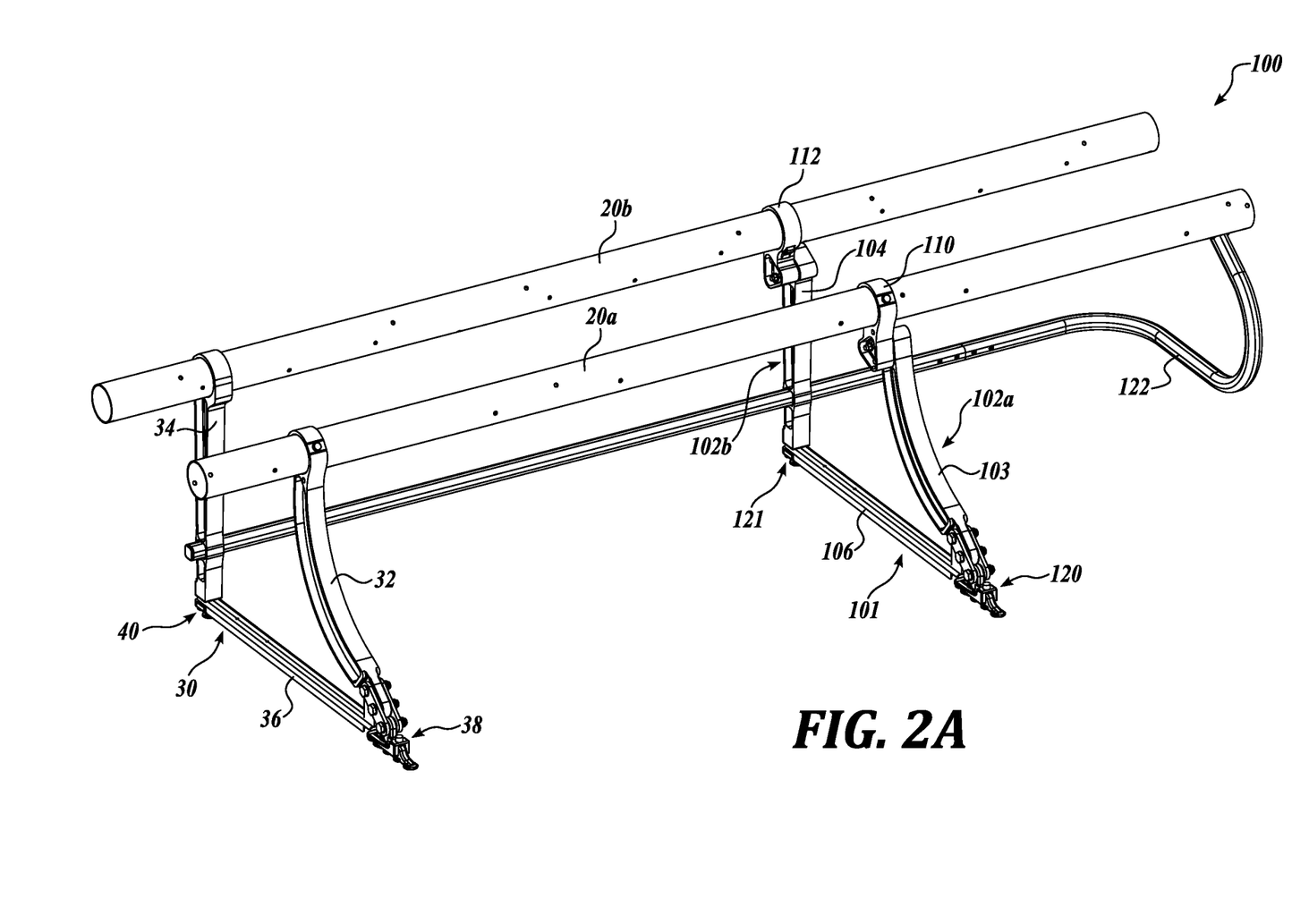
FIGS. 2A-2C are perspective, front, and side views, respectively, of one embodiment of a seat base assembly formed in accordance with aspects of the present disclosure.
Figure 2B:
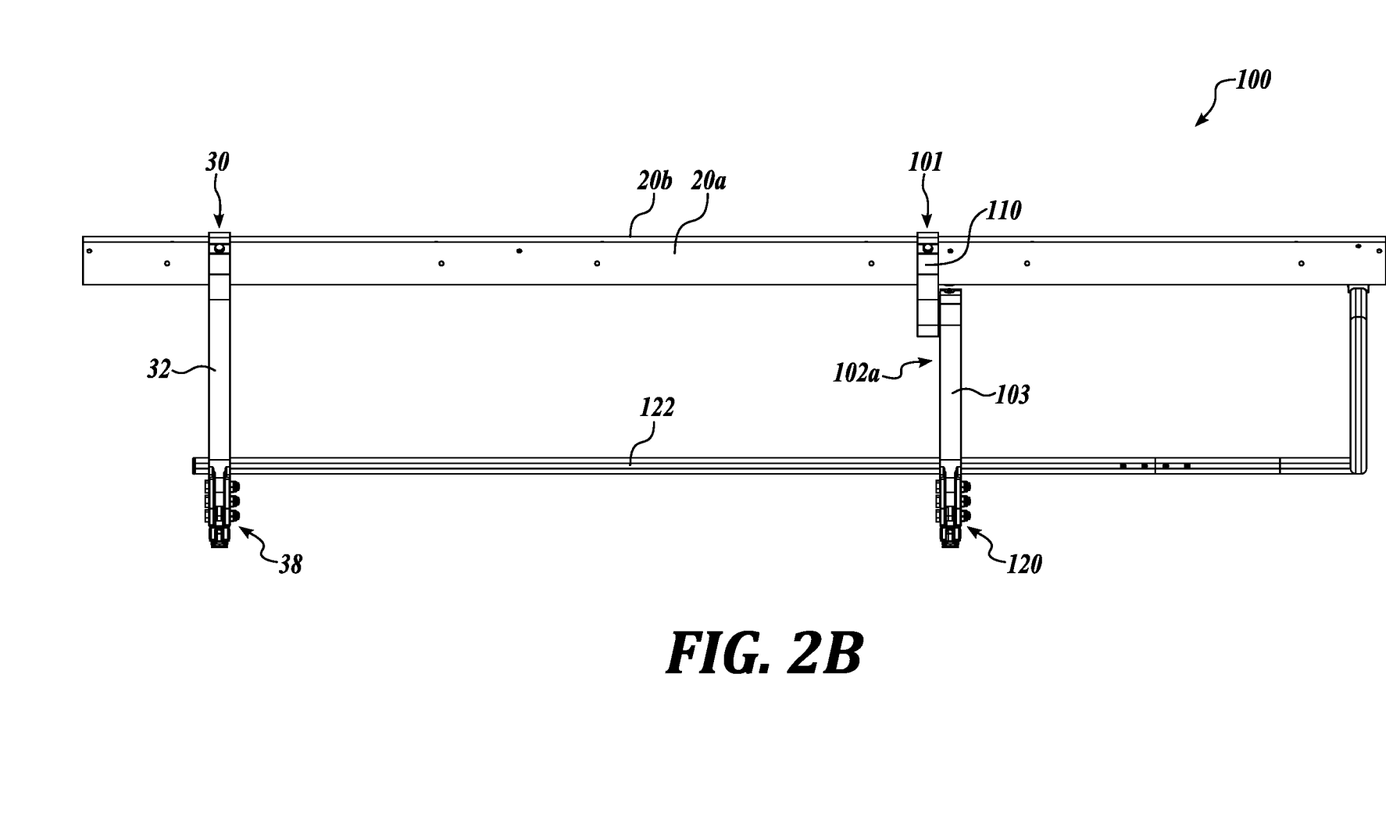
Figure 2C:
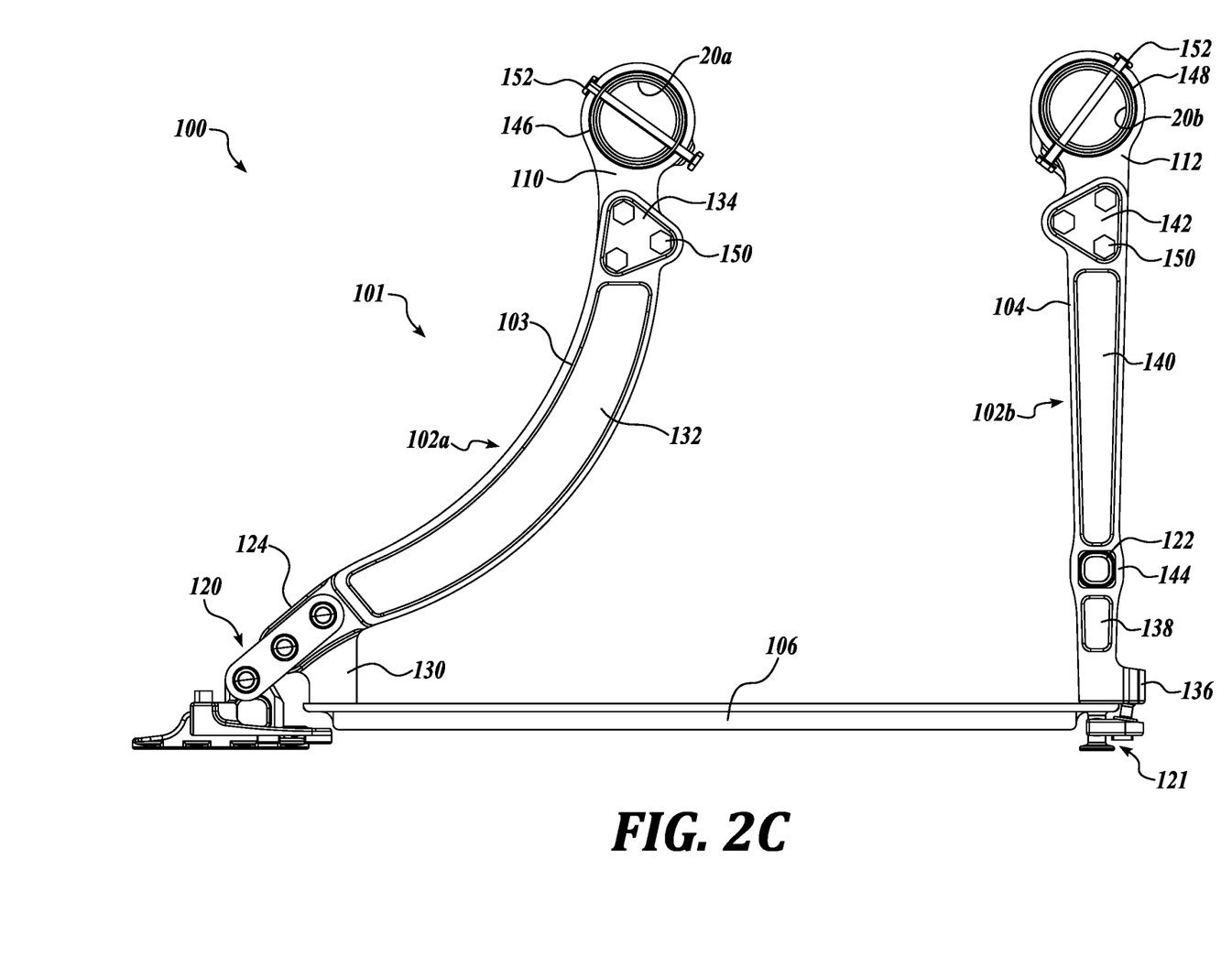

FIGS. 2A-2C are perspective, front, and side views, respectively, of one embodiment of a seat base assembly 100 (hereinafter "assembly 100") formed in accordance with aspects of the present disclosure. In some embodiments, the assembly 100 can be used with the passenger seat assembly 10 in place of the seat base frame assembly 12. The assembly 100 generally includes the first and second base frame tubes 20a and 20b, a luggage bar 122, a laterally aligned leg assembly 30 (hereinafter "leg assembly 30"), and a laterally offset leg assembly 101 (hereinafter "leg assembly 101"). Although one example of the first and second base frame tubes 20a and 20b are shown in both FIG. 1 and FIGS. 2A-2C, other tube configurations are within the scope of the present disclosure, such as other suitable shapes (square tube, I-beam, T-beam, oval tube, bent tubes, compound shapes, etc.), unequal lengths, and various mounting hole configurations. In the following description, the term "lateral" should be construed as either direction generally axially aligned with the first and second base frame tubes 20a and 20b, e.g., lateral relative to a seated passenger; "forward" and "aft" should be construed as directions perpendicular to the lateral direction and generally horizontal to a floor of the aircraft, e.g., forward and aft relative to a seated passenger; and "up" and "down" should be construed as directions perpendicular to the lateral and forward-aft directions, e.g., up and down relative to a seated passenger.

It will be appreciated that the certain configurations of the leg assemblies 30 and 101 illustrated in FIGS. 2A-2C should not be considered limiting on the present disclosure, and the leg assemblies 30 and 101 may be coupled to various other types of seat frame components with fewer or additional features as desired. In this regard, although the assembly 100 is shown in FIGS. 2A-2C with one possible arrangement of the leg assemblies 30 and 101 (e.g., with a single leg assembly 30 positioned toward one end of the assembly 100 and a single leg assembly 101 at an intermediate position toward the other end of the assembly 100), in other embodiments any arrangement or quantity of leg assemblies is suitable to support the passenger seats (e.g., the first and second base frame tubes 20a and 20b and the luggage bar 122, among other passenger seat assembly components). For example, some seat base assembly configurations can omit the leg assembly 30 and instead have two or more leg assemblies 101, or can include any other combination of leg assemblies. In addition, the particular location of the leg assemblies 30 and 101 relative to the first and second base frame tubes 20a and 20b illustrated in FIGS. 2A-2C should not be considered limiting on the present disclosure, as the leg assemblies 30 and 101 may be positioned at various locations along the first and second base frame tubes 20a and 20b and/or at various locations relative to other components of the assembly 100.

As will be explained in greater detail below, embodiments of the leg assembly 101 has components laterally offset in the view shown in FIG. 2B when compared to the leg assembly 30. The lateral offset of the leg assembly 101 is such that the upper mounting location on the first and second base frame tubes 20a and 20b is not vertically aligned with the lower mounting location to the aircraft fuselage attachment points (e.g., seat tracks). In this regard, in configurations of the passenger seat assembly 10 where another seat component (e.g., the spreader 16, a tray bracket, a seat bracket, etc.) is generally positioned in vertical alignment with the seat track, the leg assembly 101 can be arranged to mount to the aircraft fuselage attachment point while laterally offsetting the position of the upper leg portion of the leg assembly 101 along the first and second base frame tubes 20a and 20b. This configuration permits mounting the vertically aligned component (e.g., the spreader 16, a tray bracket, a seat bracket, etc.) on the first and second base frame tubes 20a and 20b directly above the aircraft fuselage attachment point without interfering with the upper leg portion of the leg assembly 101. The leg assembly 101 can also be positioned near the aircraft aisle to reduce the overhang of the aircraft seat.

The leg assembly 30 is configured to operably couple the assembly 100 to the aircraft fuselage attachment point (e.g., seat tracks) in seat configurations where another seat component (e.g., the spreader 16, a tray bracket, a seat bracket, etc.) is not arranged in vertical alignment with the aircraft fuselage attachment point. The leg assembly 30 may be similar to the leg assemblies shown and described in U.S. patent application Ser. No. 17/686,610, incorporated herein by reference, and generally includes a forward leg 32 operably coupled between the first base frame tube 20a and a forward aircraft fuselage attachment point (not shown) by a forward coupling assembly 38, an aft leg 34 operably coupled between the second base frame tube 20b and an aft aircraft fuselage attachment point (not shown) by an aft coupling assembly 40. The forward leg 32 can be offset in the forward-aft direction such that the forward coupling assembly 38 is positioned forward of the first base frame tube 20a, and the aft leg 34 can be substantially vertical such that the aft coupling assembly 40 is positioned in vertical alignment with the second base frame tube 20b. The forward and aft coupling assemblies 38 and 40 can be coupled together at their lower ends by a spreader 36 configured to span between the forward and aft coupling assemblies 38 and 40 to fix forward-to-aft positioning (e.g., to resist relative movement of the forward and aft coupling assemblies 38 and 40 within the seat track). As shown in FIG. 2B, the upper and lower portions of the forward leg 32 (and the aft leg 34 obscured by the forward leg 32) are generally vertically aligned such that the forward coupling assembly 38 is substantially positioned in vertical alignment with the upper leg portion of the forward leg 32 where the forward leg 32 attaches to the first base frame tube 20a.

The leg assembly 101 is configured to operably couple the assembly 100 to the aircraft fuselage attachment point (e.g., seat tracks) in seat configurations where another seat component (e.g., the spreader 16, a tray bracket, a seat bracket, etc.) is arranged in vertical alignment with the aircraft fuselage attachment point. The leg assembly 101 includes a forward leg assembly 102a operably coupled between the first base frame tube 20a and a forward aircraft fuselage attachment point (not shown) by a forward seat track coupling assembly 120 (hereinafter "forward coupling assembly 120"), and an aft leg assembly 102b operably coupled between the second base frame tube 20b and an aft aircraft fuselage attachment point (not shown) by an aft seat track coupling assembly 121 (hereinafter "aft coupling assembly 121"). As shown in FIG. 2C, the forward leg assembly 102a can be offset in the forward-aft direction such that the forward coupling assembly 120 is positioned forward of the first base frame tube 20a, and the aft leg assembly 102b can be substantially vertical such that the aft coupling assembly 121 is positioned in vertical alignment with the second base frame tube 20b. In other embodiments, the forward and aft leg assemblies 102a and 102b can have any suitable offset and/or alignment configuration between the aircraft fuselage attachment points and the first and second base frame tubes 20a and 20b (e.g., both offset in the same direction, both offset in opposite directions, both vertically aligned, etc.). Further, although the forward leg assembly 102a is shown with a curved base leg portion and the aft leg assembly 102b is shown with a straight base leg portion, other embodiments can include leg assemblies having any suitable shape, e.g., straight, angled, curved, etc., and with the forward and aft leg assemblies having the same or different shapes.

Although not described in detail herein, the forward and aft coupling assemblies 120 and 121 include various components configured to operably couple the leg assembly 101 to the aircraft fuselage attachment points, e.g., fasteners, brackets, links, plates, etc. The forward and aft coupling assemblies 120 and 121 can be coupled together at their lower ends by a spreader 106 configured to span between the forward and aft coupling assemblies 120 and 121 to fix forward-to-aft positioning (e.g., to resist relative movement of the forward and aft coupling assemblies 120 and 121 within the seat track). In some embodiments, the components of the forward leg assembly 102a and/or the aft leg assembly 102b can be constructed from a metal, e.g., aluminum, aluminum alloys, magnesium, magnesium alloys, titanium, steel, combinations thereof, and/or other materials or combinations of materials, and the assemblies 102a and 102b can have the same or different manufacturing processes. Further, although FIG. 2B shows a generally uniform lateral thickness of the forward and aft leg assemblies 102a and 102b, the components thereof can have any suitable lateral thickness.

The forward leg assembly 102a can include a forward base leg portion 103 and a forward upper leg portion 110. As shown in FIGS. 2A and 2B, the illustrated embodiment of the forward base leg portion 103 is laterally offset from the forward upper leg portion 110 such that the forward base and upper leg portions 103 and 110 are not positioned in lateral vertical alignment. In this regard, another seat component (e.g., the spreader 16, a tray bracket, a seat bracket, etc.) can be arranged on the first base frame tube 20a in the area vertically adjacent to the forward base leg portion 103 and lateral to the forward upper leg portion 110. Similarly, the aft leg assembly 102b can include an aft base leg portion 104 and an aft upper leg portion 112, with the aft base leg portion 104 being laterally offset from the aft upper leg portion 112 such that the aft base and upper leg portions 104 and 112 are not positioned in lateral vertical alignment. In this regard, another seat component (e.g., the spreader 16, a tray bracket, a seat bracket, etc.) can be arranged on the second base frame tube 20b in the area vertically adjacent to the aft base leg portion 104 and lateral to the aft upper leg portion 112. Although the illustrated embodiments show the offset coupling between the base leg portions 103 and 104 and the upper leg portions 110 and 112 near the upper end of the leg assemblies 102a and 102b, in other embodiments, the offset coupling is suitably near the lower end of the leg assemblies 102a and 102b (e.g., the base leg portions 103 and 104 are shorter relative to the upper leg portions 110 and 112). Embodiments of the forward and aft leg assemblies 102a and 102b will be described in greater detail below with reference to FIGS. 2C and 3A-3C.

Figure 3A:
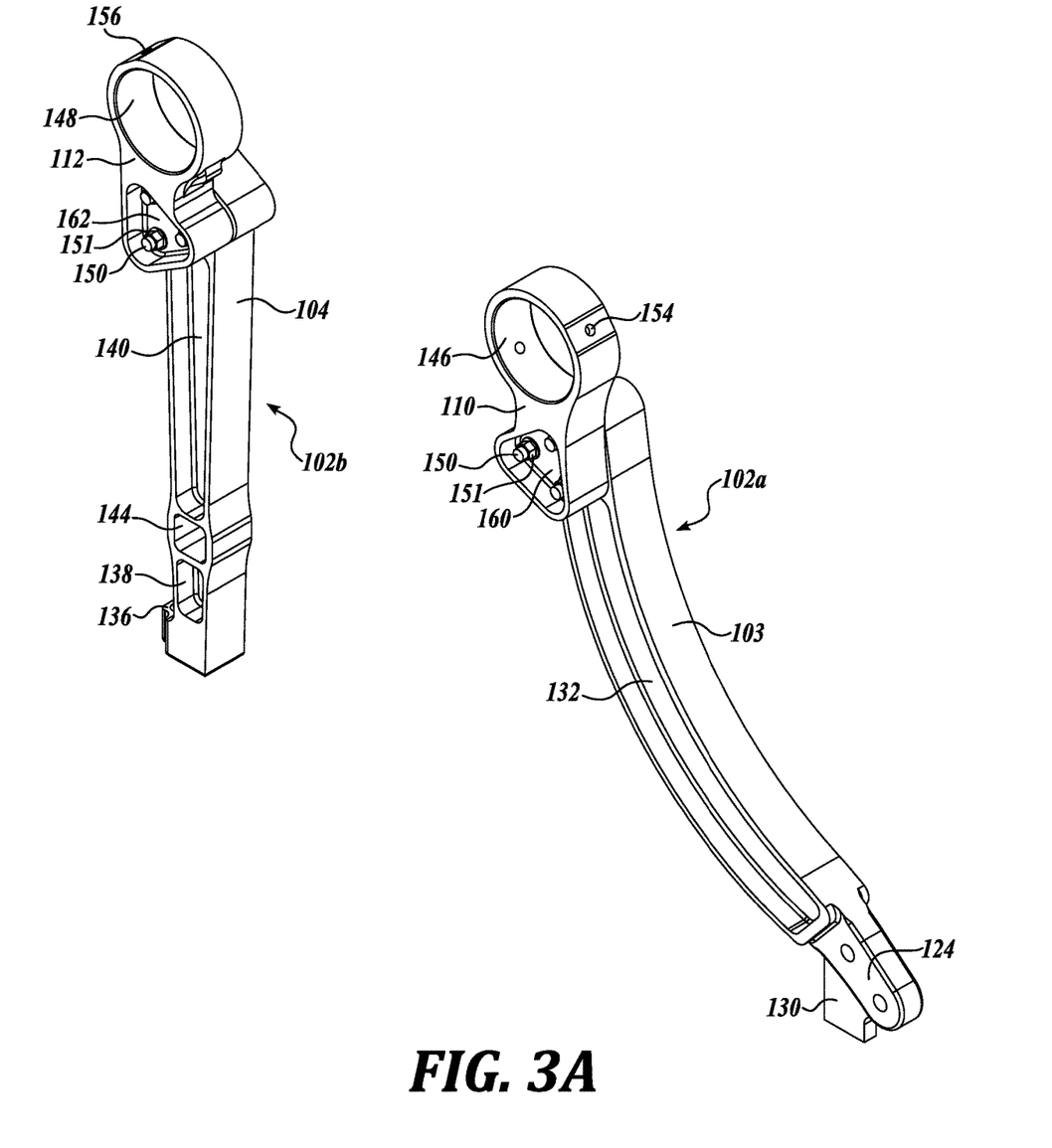
FIG. 3A is a top perspective view of one embodiment of an offset leg assembly formed in accordance with aspects of the present disclosure.
Figure 3B:
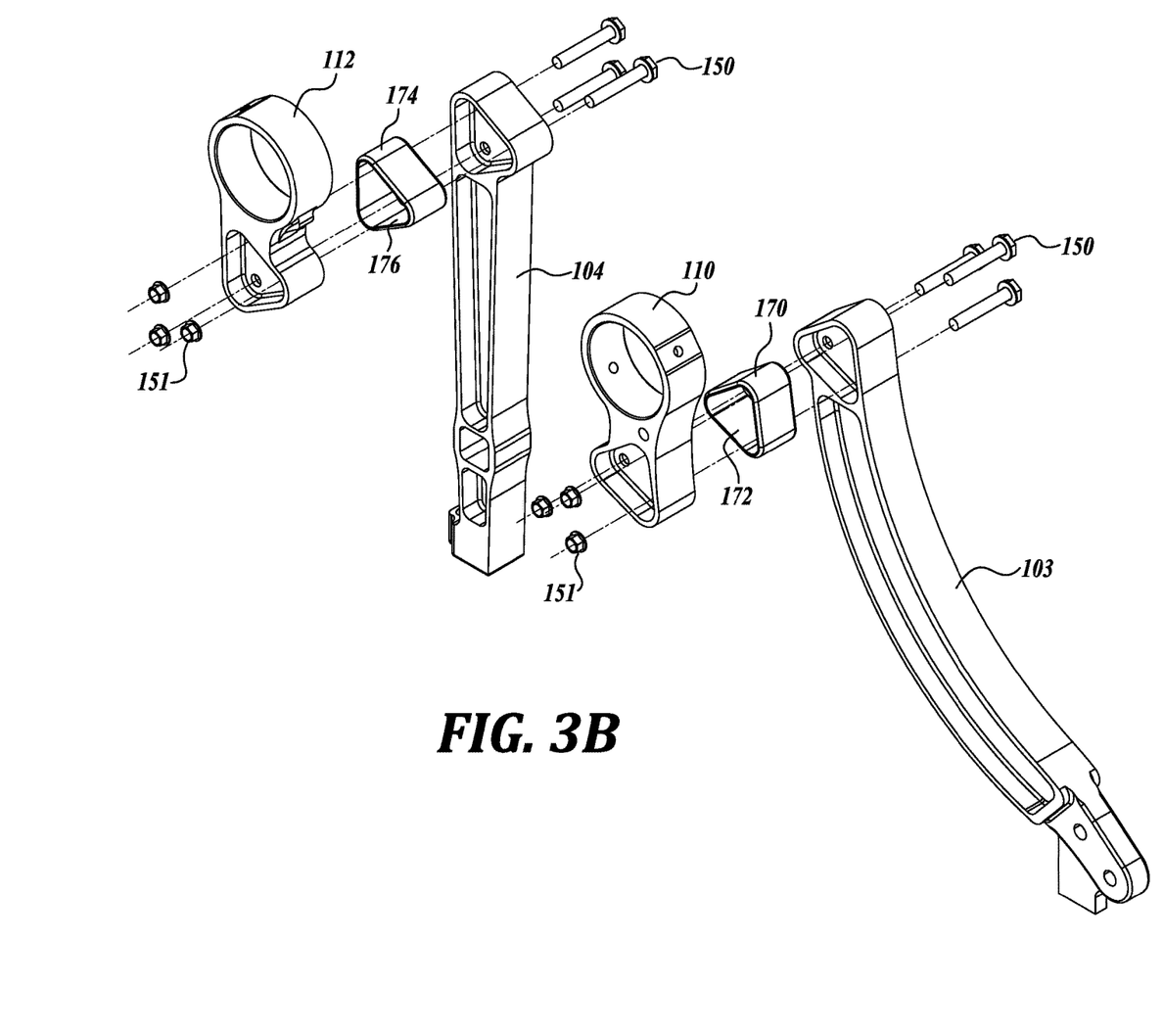
FIGS. 3B and 3C are top perspective exploded views of the offset leg assembly of FIG. 3A.
Figure 3C:
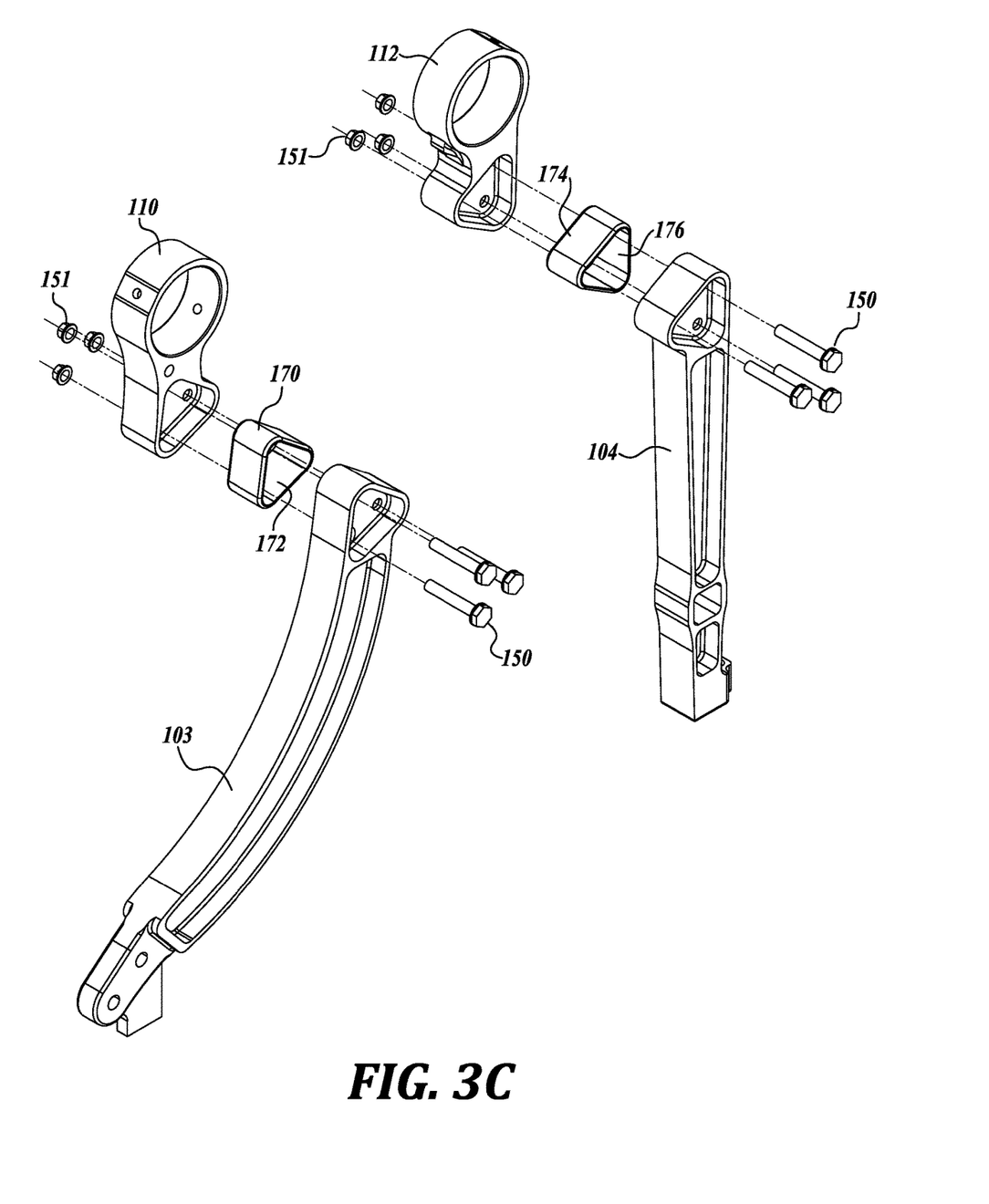

FIG. 3A is a top perspective view of the forward and aft leg assemblies 102a and 102b, and FIGS. 3B and 3C are top perspective exploded views of the forward and aft leg assemblies 102a and 102b, each formed in accordance with aspects of the present disclosure. Referring to FIGS. 2C and 3A together, the forward base leg portion 103 of the forward leg assembly 102a can include a lower shank portion 124 configured to interface with the forward coupling assembly 120, and a lower protrusion 130 configured to operably couple the spreader 106 to the forward base leg portion 103. The lower shank portion 124 can include one or more apertures to operably couple the forward leg assembly 102a to the forward coupling assembly 120 with fasteners.

The forward base leg portion 103 can further include an intermediate pocket 132 on either lateral side to decrease the weight of the forward base leg portion 103. The forward base leg portion 103 can have a coupling pocket 134 (FIG. 2C) on either side of an upper end opposite the lower shank portion 124, with the coupling pocket 134 having apertures configured to receive fasteners (e.g., bolts 150 and nuts 151) therein to operably couple the forward base leg portion 103 to the forward upper leg portion 110. The forward upper leg portion 110 can have a corresponding coupling pocket 160 on either side of the forward upper leg portion 110 and having apertures configured to receive the fasteners therein. The forward upper leg portion 110 can further include a forward aperture 146 configured to receive the first base frame tube 20a therethrough and operably couple to the first base frame tube 20a with a fastener 152 (FIG. 2C) received by an aperture 154 (FIG. 3A) and extending through the first base frame tube 20a and the forward aperture 146. As shown in FIGS. 3B and 3C, the forward base and upper leg portions 103 and 110 can be assembled in some embodiments with a forward spacer 170 having an aperture 172 through which the bolts 150 extend. The forward spacer 170 can be positioned within the coupling pockets 134 and 160 during assembly of the forward leg assembly 102a to prevent damage to the coupling pockets 134 and 160 by the clamping force of the bolts 150 and nuts 151, and the forward spacer 170 can be configured (e.g., generally corresponding to the shape of the coupling pockets 134 and 160) to fix the relative position of the forward base and upper leg portions 103 and 110 after assembly.

Similarly, the aft base leg portion 104 of the aft leg assembly 102b can include a lower protrusion 136 configured to interface with the aft coupling assembly 121 and operably couple the spreader 106 to the aft base leg portion 104. The lower protrusion 136 can include one or more slots to operably couple the aft leg assembly 102b to the aft coupling assembly 121 with corresponding features. The aft base leg portion 104 can further include intermediate pockets 138 and 140 on either lateral side to decrease the weight of the aft base leg portion 104. The aft base leg portion 104 can have a coupling pocket 142 (FIG. 2C) on either side of an upper end opposite the lower protrusion 136, with the coupling pocket 142 having apertures configured to receive fasteners (e.g., the bolts 150 and the nuts 151) therein to operably couple the aft base leg portion 104 to the aft upper leg portion 112. The aft upper leg portion 112 can have a corresponding coupling pocket 162 on either side of the aft upper leg portion 112 and having apertures configured to receive the fasteners therein. The aft upper leg portion 112 can further include an aft aperture 148 configured to receive the second base frame tube 20b therethrough and operably couple to the second base frame tube 20b with the fastener 152 (FIG. 2C) received by an aperture 156 (FIG. 3A) and extending through the second base frame tube 20b and the aft aperture 148. In some embodiments, the aft base leg portion 104 can further include an aperture 144 configured to receive the luggage bar 122 therethrough. The illustrated embodiments show the coupling pockets 134, 142, 160, and 162 having a generally triangular shape; however, other shapes are within the scope of the present disclosure, e.g., square, polygonal, round, oval, etc.

As shown in FIGS. 3B and 3C, the aft base and upper leg portions 104 and 112 can be assembled in some embodiments with an aft spacer 174 having an aperture 176 through which the bolts 150 extend. The aft spacer 174 can be positioned within the coupling pockets 142 and 162 during assembly of the aft leg assembly 102b to prevent damage to the coupling pockets 142 and 162 by the clamping force of the bolts 150 and nuts 151, and the aft spacer 174 can be configured (e.g., generally corresponding to the shape of the coupling pockets 142 and 162) to fix the relative position of the aft base and upper leg portions 104 and 112 after assembly.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the claimed subject matter is not limited to these example embodiments but rather encompasses all possible modifications and variations within the scope of the issued claims and their equivalents.

EC A. A leg assembly for an aircraft passenger seat, the leg assembly comprising: a base leg portion having a lower end configured to operably couple to a seat track coupling assembly and an upper end opposite the lower end; and an upper leg portion coupled to a lateral side of the upper end of the base leg portion, the upper leg portion having an aperture configured to receive a base frame tube of the passenger seat, wherein the upper leg portion is positioned laterally offset from the seat track coupling assembly along the base frame tube.

EC A. The leg assembly of claim 1, wherein the base leg portion is a forward base leg portion, the seat track coupling assembly is a forward seat track coupling assembly, the upper leg portion is a forward upper leg portion, the aperture is a forward aperture, and the base frame tube is a forward base frame tube, and wherein the leg assembly further comprises:

an aft base leg portion laterally aligned with and positioned apart from the forward base leg portion, the aft base leg portion having a lower end configured to operably couple to an aft seat track coupling assembly and an upper end opposite the lower end; and an aft upper leg portion coupled to a lateral side of the upper end of the aft base leg portion, the aft upper leg portion having an aft aperture configured to receive an aft base frame tube of the passenger seat, wherein the aft upper leg portion is positioned laterally offset from the aft seat track coupling assembly along the aft base frame tube.

EC B. The leg assembly of any of the preceding or subsequent example combinations, wherein the forward upper leg portion is laterally offset along the forward base frame tube in the same direction as the lateral offset of the aft upper leg portion along the aft base frame tube.

EC C. The leg assembly of any of the preceding or subsequent example combinations, wherein the lower end of the forward base leg portion is positioned forward of the upper end of the forward base leg portion, and wherein the lower end and the upper end of the aft base leg portion are vertically aligned.

EC D. The leg assembly of any of the preceding or subsequent example combinations, wherein the forward base leg portion is non-linear.

EC E. The leg assembly of any of the preceding or subsequent example combinations, wherein the aft base leg portion is linear.

EC F. The leg assembly of any of the preceding or subsequent example combinations, wherein the upper end of the forward base leg portion includes a forward coupling pocket having an aperture configured to receive a fastener therethrough to operably couple the forward upper leg portion to the forward base leg portion, and wherein the upper end of the aft base leg portion includes an aft coupling pocket having an aperture configured to receive a fastener therethrough to operably couple the aft upper leg portion to the aft base leg portion.

EC G. The leg assembly of any of the preceding or subsequent example combinations, further comprising: a forward spacer configured to be received within the forward coupling pocket, the forward spacer extending from the forward coupling pocket to the forward upper leg portion; and an aft spacer configured to be received within the aft coupling pocket, the aft spacer extending from the aft coupling pocket to the aft upper leg portion.

EC H. The leg assembly of any of the preceding or subsequent example combinations, further comprising a spreader operably coupling the lower end of the forward base leg portion and the lower end of the aft base leg portion.

EC I. The leg assembly of any of the preceding or subsequent example combinations, wherein the aft base leg portion comprises an aperture configured to receive a luggage bar.

EC J. A leg assembly for an aircraft passenger seat, the leg assembly comprising: a forward leg assembly, comprising: a forward base leg portion having a lower end configured to operably couple to a forward seat track coupling assembly; and a forward upper leg portion coupled to a lateral side of an upper end of the forward base leg portion opposite the lower end, wherein the forward upper leg portion has a forward aperture configured to receive a forward base frame tube of the aircraft passenger seat; and an aft leg assembly laterally aligned with and positioned apart from the forward leg assembly, the aft leg assembly comprising: an aft base leg portion having a lower end configured to operably couple to an aft seat track coupling assembly; and an aft upper leg portion coupled to a lateral side of an upper end of the aft base leg portion opposite the lower end, wherein the aft upper leg portion has an aft aperture configured to receive an aft base frame tube of the passenger seat, wherein the forward and aft upper leg portions are respectively positioned laterally offset from the forward and aft seat track coupling assemblies along the forward and aft base frame tubes.

EC K. The leg assembly of any of the preceding or subsequent example combinations, wherein the forward upper leg portion is laterally offset along the forward base frame tube in the same direction as the lateral offset of the aft upper leg portion along the aft base frame tube.

EC L. The leg assembly of any of the preceding or subsequent example combinations, wherein the upper end of the forward base leg portion includes a forward coupling pocket having an aperture configured to receive a fastener therethrough to operably couple the forward upper leg portion to the forward base leg portion, and wherein the upper end of the aft base leg portion includes an aft coupling pocket having an aperture configured to receive a fastener therethrough to operably couple the aft upper leg portion to the aft base leg portion.

EC M. The leg assembly of any of the preceding or subsequent example combinations, further comprising: a forward spacer configured to be received within the forward coupling pocket, the forward spacer extending from the forward coupling pocket to the forward upper leg portion; and an aft spacer configured to be received within the aft coupling pocket, the aft spacer extending from the aft coupling pocket to the aft upper leg portion.

EC N. The leg assembly of any of the preceding or subsequent example combinations, further comprising a spreader operably coupling the lower end of the forward base leg portion and the lower end of the aft base leg portion.

EC O. A passenger seat, comprising: a seat back; a seat base frame assembly operably coupled between a seat track of an aircraft fuselage and the seat back, the seat base frame assembly comprising: a forward base frame tube; an aft base frame tube spaced apart from the forward base frame tube; a forward leg assembly including a forward base leg portion and a forward upper leg portion coupled to a lateral side of an upper end of the forward base leg portion, wherein the forward upper leg portion has a forward aperture for receiving the forward base frame tube; and an aft leg assembly laterally aligned with and positioned apart from the forward leg assembly, the aft leg assembly including an aft base leg portion and an aft upper leg portion coupled to a lateral side of an upper end of the aft base leg portion, wherein the aft upper leg portion has an aft aperture for receiving the aft base frame tube, wherein the forward and aft upper leg portions are positioned laterally offset from the seat track along the forward and aft base frame tubes.

EC P. The passenger seat of any of the preceding or subsequent example combinations, further comprising: a secondary forward leg operably coupled to the forward base frame tube at a position vertically aligned with the seat track and spaced laterally apart from the forward leg assembly; and a secondary aft leg operably coupled to the aft base frame tube at a position vertically aligned with the seat track and laterally aligned with the secondary forward leg.

EC Q. The passenger seat of any of the preceding or subsequent example combinations, further comprising a spreader operably coupled to the aft base frame tube in a position vertically aligned with the seat track.

EC R. The passenger seat of any of the preceding or subsequent example combinations, wherein the forward and aft leg assemblies are positioned closer to an aisle of the aircraft fuselage than the secondary forward and aft legs.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A leg assembly for an aircraft passenger seat, the leg assembly comprising:
   a forward base leg portion having a lower end configured to operably couple to a forward seat track coupling assembly and an upper end including a forward coupling pocket opposite the lower end;
   a forward upper leg portion coupled to a lateral side of the upper end of the forward base leg portion, the forward upper leg portion having a forward aperture configured to receive a forward base frame tube of the passenger seat, wherein the forward coupling pocket has an aperture configured to receive a fastener therethrough to operably couple the forward upper leg portion to the forward base leg portion;
   an aft base leg portion laterally aligned with and positioned apart from the forward base leg portion, the aft base leg portion having a lower end configured to operably couple to an aft seat track coupling assembly and an upper end including an aft coupling pocket opposite the lower end; and
   an aft upper leg portion coupled to a lateral side of the upper end of the aft base leg portion, the aft upper leg portion having an aft aperture configured to receive an aft base frame tube of the passenger seat, wherein the aft coupling pocket has an aperture configured to receive a fastener therethrough to operably couple the aft upper leg portion to the aft base leg portion,
   wherein the forward upper leg portion is positioned laterally offset from the forward seat track coupling assembly along the forward base frame tube, and wherein the aft upper leg portion is positioned laterally offset from the aft seat track coupling assembly along the aft base frame tube.

2. The leg assembly of claim 1, wherein the forward upper leg portion is laterally offset along the forward base frame tube in the same direction as the lateral offset of the aft upper leg portion along the aft base frame tube.

3. The leg assembly of claim 1, wherein the lower end of the forward base leg portion is positioned forward of the upper end of the forward base leg portion, and wherein the lower end and the upper end of the aft base leg portion are vertically aligned.

4. The leg assembly of claim 3, wherein the forward base leg portion is non-linear.

5. The leg assembly of claim 3, wherein the aft base leg portion is linear.

6. The leg assembly of claim 1, further comprising:
   a forward spacer configured to be received within the forward coupling pocket, the forward spacer extending from the forward coupling pocket to the forward upper leg portion; and
   an aft spacer configured to be received within the aft coupling pocket, the aft spacer extending from the aft coupling pocket to the aft upper leg portion.

7. The leg assembly of claim 1, further comprising a spreader operably coupling the lower end of the forward base leg portion and the lower end of the aft base leg portion.

8. The leg assembly of claim 1, wherein the aft base leg portion comprises an aperture configured to receive a luggage bar.

9. A leg assembly for an aircraft passenger seat, the leg assembly comprising:
   a forward leg assembly, comprising:
     a forward base leg portion having a lower end configured to operably couple to a forward seat track coupling assembly; and
     a forward upper leg portion coupled to a lateral side of an upper end of the forward base leg portion including a forward coupling pocket opposite the lower end, the forward coupling pocket having an aperture configured to receive a fastener therethrough to operably couple the forward upper leg portion to the forward base leg portion, wherein the forward upper leg portion has a forward aperture configured to receive a forward base frame tube of the aircraft passenger seat; and
   an aft leg assembly laterally aligned with and positioned apart from the forward leg assembly, the aft leg assembly comprising:
     an aft base leg portion having a lower end configured to operably couple to an aft seat track coupling assembly; and
     an aft upper leg portion coupled to a lateral side of an upper end of the aft base leg portion including an aft coupling pocket opposite the lower end, the aft coupling pocket having an aperture configured to receive a fastener therethrough to operably couple the aft upper leg portion to the aft base leg portion, wherein the aft upper leg portion has an aft aperture configured to receive an aft base frame tube of the passenger seat,
   wherein the forward and aft upper leg portions are respectively positioned laterally offset from the forward and aft seat track coupling assemblies along the forward and aft base frame tubes.

10. The leg assembly of claim 9, wherein the forward upper leg portion is laterally offset along the forward base frame tube in the same direction as the lateral offset of the aft upper leg portion along the aft base frame tube.

11. The leg assembly of claim 9, further comprising:
    a forward spacer configured to be received within the forward coupling pocket, the forward spacer extending from the forward coupling pocket to the forward upper leg portion; and
    an aft spacer configured to be received within the aft coupling pocket, the aft spacer extending from the aft coupling pocket to the aft upper leg portion.

12. The leg assembly of claim 9, further comprising a spreader operably coupling the lower end of the forward base leg portion and the lower end of the aft base leg portion.

13. A passenger seat, comprising:
a seat back;
a seat base frame assembly configured to be operably coupled between a seat track of an aircraft fuselage and the seat back, the seat base frame assembly comprising:
a forward base frame tube;
an aft base frame tube spaced apart from the forward base frame tube;
a forward leg assembly including a forward base leg portion and a forward upper leg portion coupled to a lateral side of an upper end of the forward base leg portion, the upper end including a forward coupling pocket having an aperture configured to receive a fastener therethrough to operably couple the forward upper leg portion to the forward base leg portion, wherein the forward upper leg portion has a forward aperture for receiving the forward base frame tube; and
an aft leg assembly laterally aligned with and positioned apart from the forward leg assembly, the aft leg assembly including an aft base leg portion and an aft upper leg portion coupled to a lateral side of an upper end of the aft base leg portion, the upper end including an aft coupling pocket having an aperture configured to receive a fastener therethrough to operably couple the aft upper leg portion to the aft base leg portion, wherein the aft upper leg portion has an aft aperture for receiving the aft base frame tube,
wherein the forward and aft upper leg portions are configured to be positioned laterally offset from the seat track along the forward and aft base frame tubes.

14. The passenger seat of claim 13, further comprising:
a secondary forward leg operably coupled to the forward base frame tube at a position vertically aligned with the seat track and spaced laterally apart from the forward leg assembly; and
a secondary aft leg operably coupled to the aft base frame tube at a position vertically aligned with the seat track and laterally aligned with the secondary forward leg.

15. The passenger seat of claim 14, wherein the forward and aft leg assemblies are configured to be positioned closer to an aisle of the aircraft fuselage than the secondary forward and aft legs.

16. The passenger seat of claim 13, further comprising a spreader operably coupled to the aft base frame tube in a position vertically aligned with the seat track.

* * * * *